Aug. 19, 1941.  P. P. CUPAL  2,253,420
TRACTOR
Filed July 13, 1939   3 Sheets-Sheet 1
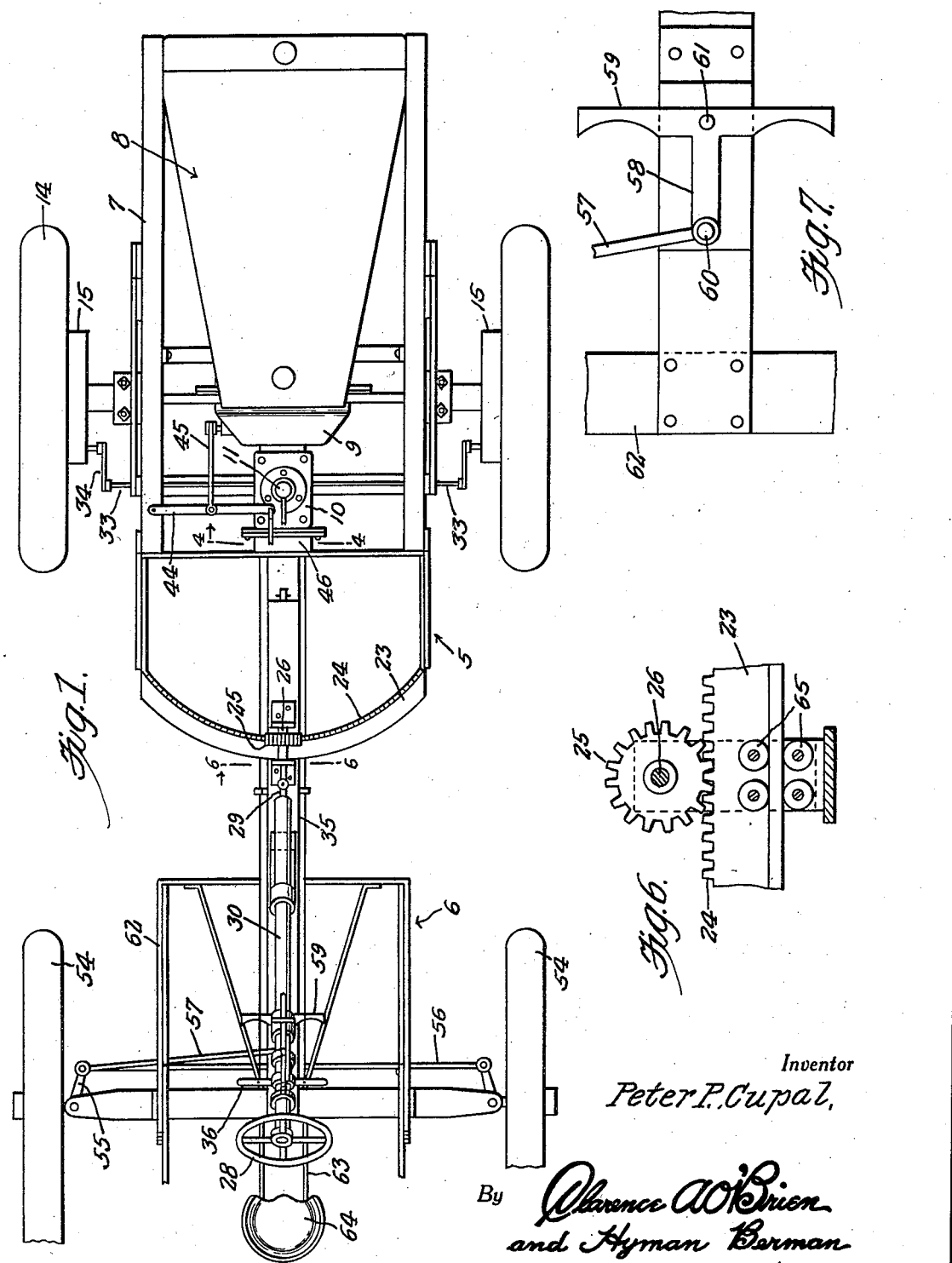
Inventor
Peter P. Cupal,
By Clarence A. O'Brien
and Hyman Berman
Attorneys

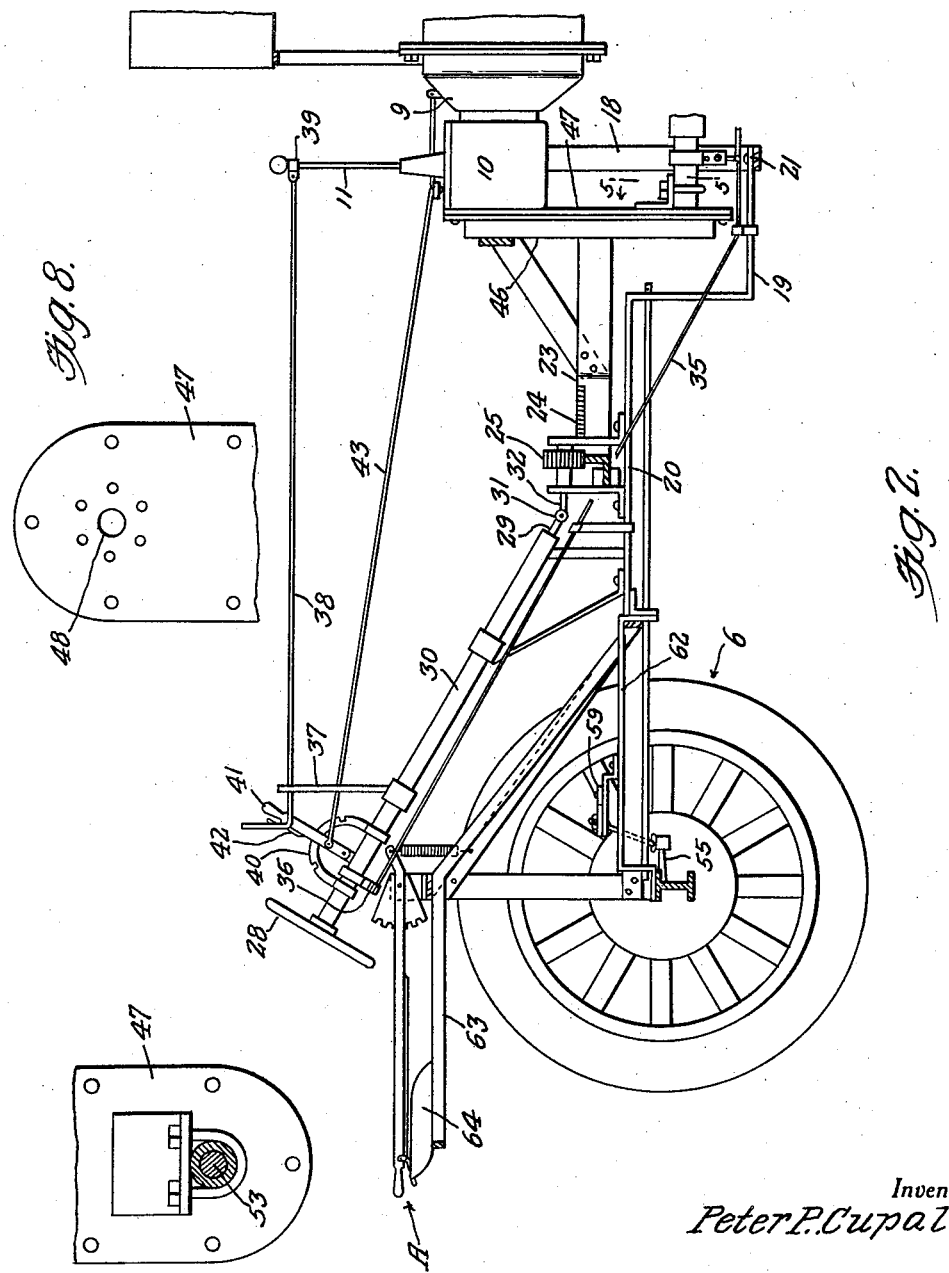

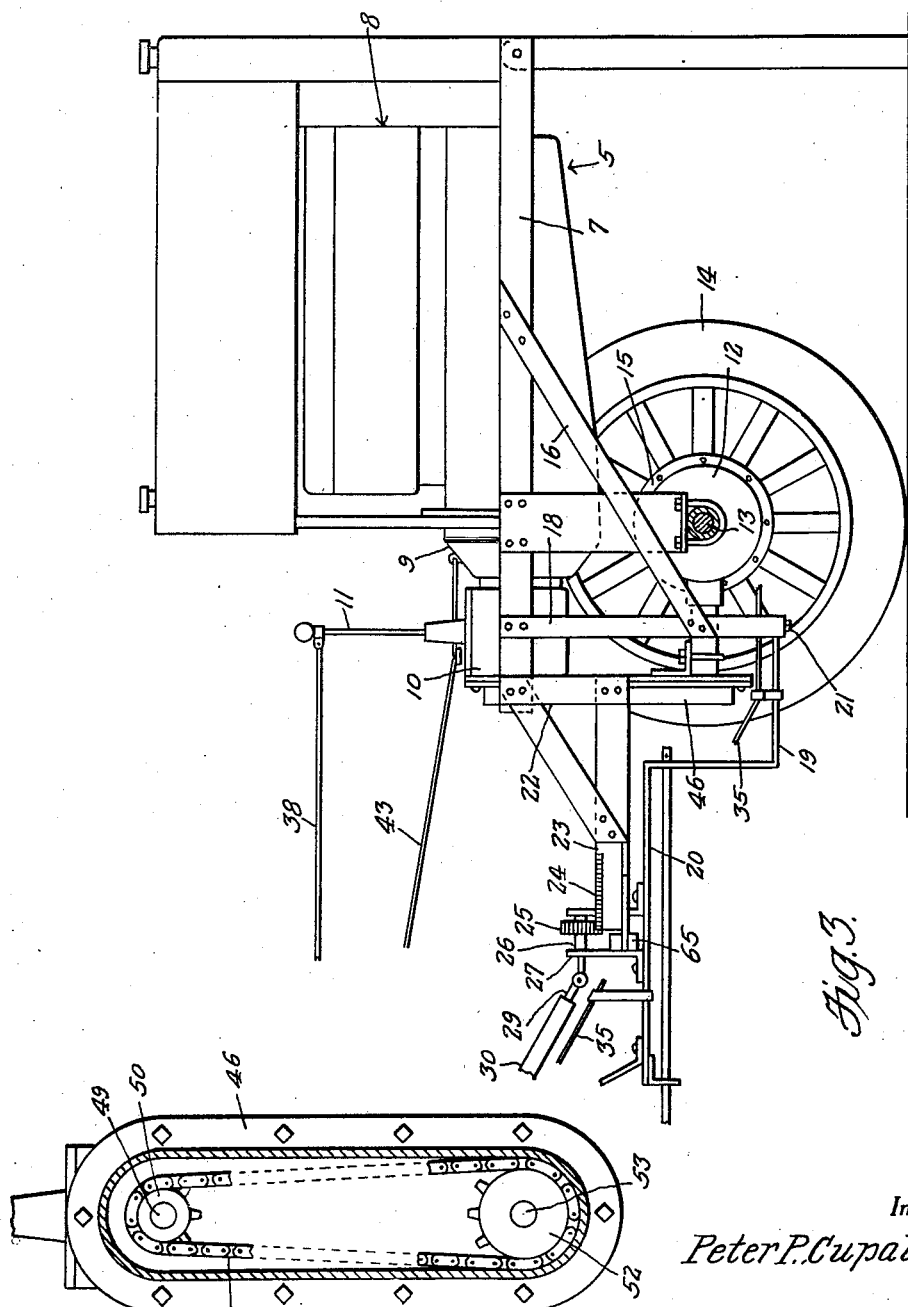

Patented Aug. 19, 1941

2,253,420

UNITED STATES PATENT OFFICE 2,253,420

TRACTOR

Peter P. Cupal, Flint, Mich.

Application July 13, 1939, Serial No. 284,357

1 Claim. (Cl. 180—12)

This invention appertains to new and useful improvements in tractors and more particularly to a tractor involving only two wheels and which can be readily connected with various other types of agricultural implements of the wheeled type.

The principal object of the present invention is to provide a tractor outfit which will permit turning of the tractor in a very limited space.

Another important object of the invention is to provide a tractor assembly which can be readily utilized for various farm demands.

Other objects and advantages of the invention will become apparent to the reader of the following specification.

In the drawings—

Figure 1 represents a top plan view of the assembly.

Figure 2 is a fragmentary side elevational view.

Figure 3 is a side elevational view of the front truck.

Figure 4 is a section on the line 4—4 of Figure 1.

Figure 5 is a sectional view on a line 5—5 of Figure 2.

Figure 6 is a sectional view on a line 6—6 of Figure 1.

Figure 7 is a fragmentary top plan view of the steering means for the rear truck.

Figure 8 is a fragmentary elevational view of the front side of the gear case.

Referring to the drawings wherein like numerals designate like parts, it can be seen that the numeral 5 generally refers to the front truck or power section of the tractor, while numeral 6 generally refers to the rear truck or control section of the tractor.

The front truck 5 includes the frame 7 upon which the internal combustion engine generally referred to by numeral 8 is mounted. This engine 8 has the clutch 9 and the transmission 10 and from the latter extends the usual gear shift lever 11.

Numeral 12 denotes the usual differential and from this extends the axle section 13 to the wheels 14 and each of these wheels 14 has a brake 15.

Suitable brace means 16 is provided between the frame 7 and depending frame structure 18, this depending frame 18 having a cross portion to which the depending portion 19 of the tongue structure 20 is swingably connected as at 21.

From the rear members 22 of the frame 7 extends the arcuate shaped angle bar 23, the upper portion of which is constructed to provide gear teeth 24. Engaging with the gear teeth 24 is the pinion 25, the latter being carried by the shaft 26 which is journalled through the brackets 27—27.

As clearly shown in Figures 2 and 3, a steering wheel 28 is mounted on the rear truck 6, the same being attached to the steering shaft 29 which extends through the steering shaft housing 30. Yieldable connection 31 is provided between the shaft 29 and the short shaft 32 carrying the gear 25.

Obviously, by rotating the steering wheel 28, the front truck 5 can be rotated and to consummate steering, either one brake or the other on the wheels 14 can be applied to cause pivoting of that particular wheel. These brakes are controlled through the shaft 33 and levers 34 from the control rods 35 and levers 36 on the steering shaft housing 30.

An upright 37 on the steering shaft housing 30 has the control rod 38 extending therethrough to clamp as at 39 to the gear shift lever 11. A notched frame 40 is provided on the steering shaft housing 30 and a hand lever 41 is swingably mounted adjacent thereto and carries the detent 42 operative with the frame 40. From this hand lever 41 extends the rod 43 to the pivotal arm 44 (see Fig. 1) on the front truck 5 and a pivotal link 45 extends from the intermediate portion of the arm 44 to connect to the mechanism of the clutch 9.

Extending downwardly from the transmission 10 is the gear housing 46 normally closed by the front plate 47 which has an opening therein at its upper end portion denoted by the numeral 48 through which the drive from the transmission is made, this including the shaft 49. A sprocket 50 is provided on the shaft 49 in the housing 46 and a sprocket chain 51 is trained over the sprocket 50 and under the sprocket wheel 52 on the lower shaft 53 which extends forwardly from the housing 46 to the differential 12 of the front truck 5.

The wheels 54—54 of the rear truck 6 are steerable by the arms 55 which are connected by the tie rod 56. A pivotal rod 57 extends from one of these arms 55 to the shank 58 of the foot bar 59, this rod 57 being pivotally connected as at 60 to the shank 58, while the foot bar 59 is pivotally mounted as at 61 on the subframe 62 of the rear truck 6.

A frame 63 rises from the frame 62 and extends rearwardly to support the driver's seat 64.

As can be seen in Figure 6, rollers 65 are provided above and below the horizontal flange of the toothed angle bar 23 to evenly guide the same.

The control means A involving a lever at each side of the seat is intended, one for lifting the cultivator (not shown) up or down and the other for regulating the cultivator (not shown) so that it operates evenly on the ground.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination, a tractor including a frame and power transmission means mounted thereon, a control truck, said truck including a frame, a horizontally disposed arcuate gear on the frame of the tractor, a tongue extending forwardly from the truck frame and having a downwardly and forwardly extending arm, a pivotal connection between the tractor frame and the forward end of the arm, a gear mounted on the control truck and meshing with the first-mentioned gear, and means on the truck for rotating the last-mentioned gear, said downwardly and forwardly extending arm being adapted to avoid the transmission portion of the tractor, said connection between the arm and the tractor consisting of a U-shaped frame having its upper ends attached to the frame of the tractor and a pivotal connection between the arm and the lower intermediate portion of the U-shaped frame.

PETER P. CUPAL.